Patented June 3, 1952

2,599,094

UNITED STATES PATENT OFFICE 2,599,094

CELLULOSIC FIBROUS CALCIUM SILICATE PIGMENT, A METHOD OF MAKING IT AND A SHEET OF PAPER CONTAINING IT

William L. Craig, Westport, Conn., assignor to R. T. Vanderbilt Company, Inc., New York, N. Y., a corporation of New York No Drawing. Application December 10, 1949, Serial No. 132,410

15 Claims. (Cl. 92—3)

This invention has for its object a gelatinized cellulosic fibrous hydrated calcium silicate pigment and a method of producing it and new composite sheets of paper made therewith.

The new fibrous hydrated calcium silicate pigments are highly pigmented cellulosic pulp fibers containing finely divided hydrated calcium silicate precipitated largely within the fibers and on and around the fibers in amount greatly exceeding the weight of the fibers and advantageously several times the dry weight of the fibers.

The new fibrous pigments are produced from swollen, hydrated and gelatinized cellulosic pulp fibers containing a soluble calcium salt, advantageously calcium chloride, largely within the fibers by reaction of a soluble silicate therewith, particularly sodium silicate or water glass, with resulting precipitation of finely divided hydrated calcium silicate largely within the fibers as well as on and around the fibers.

The new paper made with the fibrous hydrated calcium silicate pigment is made up largely of untreated stock or fibers combined with a regulated amount of the highly pigmented fibrous hydrated calcium silicate pigment.

The new fibrous pigments are made by first subjecting the fibers in the form of a pulp to the action of a solution of calcium chloride containing an amount of chloride exceeding the dry weight of the fibers, and of a sufficient concentration to effect swelling and hydration and gelatinization of the fibers, or with a more dilute solution of calcium chloride combined with mechanical working or beating of the pulp to effect swelling and hydration and gelatinization of the fibers so that a large amount of calcium chloride will be contained within the gelatinized fibers; and the resulting fibers are then treated with a solution of sodium silicate to precipitate the insoluble hydrated calcium silicate largely within the fibers and also on and around the fibers.

The invention is of more or less general application to the treatment of cellulosic pulp fibers including chemical, semi-chemical or mechanical pulp fibers commonly used in paper making, such as kraft, sulfite, and soda pulp (chemical pulp) or groundwood (mechanical pulp). The fibers treated may be bleached or unbleached stock and may be stock which has been previously refined in a beater or refining engine or which may be unrefined stock or which may be subjected to beating or refining in connection with the treatment of the pulp to produce the new fibrous pigment.

Where the pulp is available and treated at a pulp or paper mill it is advantageously used in the form of a concentrated stock containing, e. g., around 4% or 5% or 6% or more of fibers (dry basis) and the calcium chloride is advantageously added in the form of dry calcium chloride and in amount equal to and advantageously in excess of the weight of the fibrous stock (dry basis). Thus, with stock containing around 4% or 5% or 6% of fibers (dry basis) the amount of calcium chloride is advantageously such as to form a solution of, e. g., 10% or higher or up to 15% or 20% or more. A more dilute calcium chloride solution can be used, e. g., a solution containing 5% to 10% of calcium chloride, with prolonged mechanical treatment or beating to effect hydration and swelling and gelatinization of the fibers.

With strong calcium chloride solutions, e. g., around 13% to 20%, a profound modification of the cellulosic fibers takes place in a short period of time, e. g., 5 to 10 or 15 minutes, with proper agitation. The fibers become more or less gelatinous and transparent in appearance. With more dilute calcium chloride solutions prolonged beating of the pulp in a beater is advantageous to promote the hydrating and gelatinizing action and also to convert the pulp into a refined pulp.

Instead of adding dry calcium chloride to an ordinary pulp containing a small percentage of fibers, the treatment can be carried out by adding dry pulp stock (chemical, semi-chemical or mechanical pulp) to a more dilute aqueous solution of calcium chloride, advantageously a 10% solution, and with beating or refining of the pulp to promote the action of the calcium chloride on the fibers and to bring about the swelling and hydrating and gelatinizing action with resulting incorporation of a considerable amount of the calcium chloride within the fibers as well as on and around them.

After such treatment of the pulp fibers with calcium chloride the stock is treated with a solution of sodium silicate (advantageously water glass), e. g., in the form of a 10% or 20% solution in sufficient amount to react with the calcium chloride and precipitate insoluble hydrated calcium silicate largely within and also on and around the modified fibers. The amount of added sodium silicate is equal to or somewhat more or less than the amount which is sufficient to react with all of the calcium chloride used. With cellulose fibers (chemical pulp) the amount of sodium silicate is advantageously slightly in excess of that required to react with all of the calcium chloride. With groundwood fibers care should be taken in general to avoid any excess of the sodium silicate or of alkali formed which would darken or otherwise affect the stock, and with such stock the calcium chloride and sodium silicate are used in reacting proportions or with a slight excess of calcium chloride, or with a buffer salt.

The resulting treated and pigmented stock is highly hydrated and has little strength, or relatively much less strength than the untreated stock, but it carries the precipitated hydrated calcium silicate distributed throughout the hydrated stock while pigment is also precipitated on the hydrated stock and to a limited extent in the relatively small amount of water in which the stock is suspended, while in a swollen and gelatinized state.

The reaction of the calcium chloride and sodium silicate to form the precipitated hydrated calcium silicate also forms sodium chloride in solution and the resulting highly pigmented stock or fibrous pigment is washed to remove this salt. A large part of this salt will be removed when the fibrous pigment is filtered or the main part of the water is separated from it, but it is desirable to wash the treated stock to effect more or less complete removal of the sodium chloride before the fibrous pigment is dried or used. The washing of the fibrous pigment can be carried out by decantation or by washing in pulp washers with replacement of the sodium chloride solution with fresh water or by filtering the fibrous pigment and washing the stock on the filter.

Where the fibrous pigment is produced at a paper mill and is to be used for admixture with untreated pulp for paper manufacture the hydrated pulp is advantageously kept in suspension in water until used. Where the fibrous pigment is not to be kept in pulp form it is advantageously passed over a filter or screen or formed into laps to form a continuous sheet from which most of the water is drained or sucked by vacuum or it is passed through pressure rolls to squeeze out as much water as possible. This gives the fibrous pigment in wet lap or sheet form for storage or shipment.

The new fibrous pigment can also be advantageously dried under regulated conditions to form a dry fibrous calcium silicate pigment. It is important, for producing dry fibrous pigments which can be readily rehydrated and converted into pulp form with water to avoid excessive drying and the production of a bone dry product. The drying can, however, be carried out rapidly by passing the wet pigmented fibers through a continuous drier in sheet form and drying to a point where it still contains a small amount of water, e. g., around 5% to 10% more or less based on the fibrous content of the pigmented fibers. Ordinary drying rolls can be used with a limited time of contact of the continuous pigmented fiber sheet with hot rolls to avoid excessive heating and drying. The wet fibrous pigment can also be broken up into lumps or into small pieces before drying. The dried product can also be broken up into lumps or into pieces or into coarse powder form or the dried product can be formed into rolls or into laps for storage and shipment.

The new fibrous pigment will contain the finely divided, precipitated calcium silicate in amount greatly exceeding the weight of the fibers treated (dry basis) and advantageously in amount three or four or five times the dry weight of the fibers, or even a higher percentage, e. g., around 15% fiber (dry basis) and 85% precipitated hydrated calcium silicate, or 10% fiber (dry basis) and 90% precipitated hydrated calcium silicate.

When sodium silicate having a ratio of sodium oxide to silica of approximately $1Na_2O$ to $3.25SiO_2$ (water glass) is reacted with the calcium chloride, the hydrated calcium silicate formed has the approximate formula $$CaO.4SiO_2.3H_2O$$

and the weight of the hydrated calcium silicate is approximately three and one-half times the weight of the calcium chloride. When the pulp is treated with an amount of calcium chloride exceeding the weight of the fibers (dry basis), the amount of hydrated calcium silicate formed will be several times the amount of calcium chloride used.

The new fibrous hydrated calcium silicate pigment is a valuable pigment for use in paper making for admixture with paper pulp. If the cellulosic fibers treated are beaten or refined prior to or during the treatment the resulting fibrous pigment is a refined pulp stock which can be added to the furnish to be used for paper making after it has been prepared, e. g., by admixing it in regulated amounts with the furnish before it goes to the paper machine. It can also advantageously be added to the beater and subjected to further refining or added to the beater near the end of the refining treatment. Where the fibrous pigment is in a dry state it can be first rehydrated by admixing it with water and forming it into a pigmented fibrous pulp and added in this form to the other pulp to be used for paper making.

The new fibrous pigment has an important advantage over ordinary pigments which are admixed with paper pulp in that it is more readily retained and losses of pigment are minimized. Although the hydrated calcium silicate is precipitated in the form of fine particles these are held by the fibers, largely within the fibers, but also on and around the fibers, so that the fibers serve as a vehicle or skeleton for the fine calcium silicate pigment particles.

When the new fibrous pigments are used in paper manufacture the paper can be made from the admixed stocks on Fourdrinier or cylinder machines and various kinds of paper can be made including book paper, magazine paper, newsprint, and other printing papers which are directly prepared as pigmented papers. The present invention enables a sheet of paper to be produced approaching a precoated sheet on a paper machine. In general only a small percentage of fibrous pigment on the total stock will be necessary to incorporate the required amount of pigment in the paper. For various grades of paper an amount of fibrous pigment in which the fibrous content is around 5% or 10% of the total fibers of the stock can advantageously be used.

The fibrous pigments, while fibrous in character, are so modified and weakened by the hydrating treatment and pigment precipitation therein and thereon that they are not suitable by themselves for paper manufacture. But their high pigment content makes them valuable fibrous pigments for admixture with untreated fibers. Thus, fibrous pigments containing 10% or 15% or 25% of fibers (dry basis) and 90% or 85% or 75% precipitated calcium silicate, are in fibrous form even though they are made up mainly of the finely divided precipitated calcium silicate. And these fibrous pigments are valuable pigments for admixture in varying amounts of, e. g., 5% or 10% or 25% more or less, depending upon the amount of pigment desired in the resulting sheet of paper.

The invention will be further illustrated by the following specific examples, but it will be understood that the invention is not limited thereto. The parts are by weight:

*Example 1.*—A groundwood stock of 5% consistency is prepared in a beater and to 200 parts of this stock containing 10 parts (dry basis) of fibers is added 18 parts of dry calcium chloride, with agitation and refined in a refiner. This calcium chloride dissolves and forms a solution which reacts with the groundwood stock. After about 15 to 30 minutes the stock is modified and hydrated and more or less gelled and 53 parts of sodium silicate, $Na_2O.3.25SiO_2$ (water glass), are then added in the form of a 10% solution. The sodium silicate reacts rapidly with the calcium chloride that is in and on and around the fibers and a sufficient period of time, e. g., 10 to 15 minutes, is allowed to secure full precipitation. The precipitated fibrous pigment is then thoroughly washed to remove the salt (sodium chloride) that has been formed by the reaction. The washed pigment is then passed over a screen or filter or between rolls to form it into lap form or is dried to a moisture content of around 5 to 10% either by drying in sheet form or by grinding or breaking up into smaller pieces before drying.

*Example 2.*—An alpha-cellulose pulp is prepared by beating in the beater at a 6% consistency and to 1035 parts of the resulting stock containing 62 parts of alpha-cellulose (dry basis) are added 111 parts of dry calcium chloride, with continued stirring or agitation in the beater as described in Example 1, and then 326 parts of sodium silicate, $Na_2O.3.25SiO_2$ (water glass), are added in the form of a 10% solution and the process is continued as in Example 1.

The products of the above examples contain many times as much pigment as fiber (dry basis). With refined fibers the fibers may have a fluffy appearance on grinding. Although the dry product is made up mainly of pigment it is nevertheless fibrous in character, retaining in general the fibrous structure of the treated fibers but containing a large amount of precipitated pigment within and on and around the fibers.

*Example 3.*—Bleached sulfite pulp in the form of ordinary sheets or laps is added to a 10% calcium chloride solution in a beater in amount sufficient to form a 6% stock (6% pulp, dry basis) and the stock is subjected to a beating and refining treatment until the fibers become hydrated and swollen and somewhat gelatinous in character with little free water apparent around the swollen fibers and with resulting refining of the pulp to a greater or less extent. To the resulting mixture is added a 10% sodium silicate (water glass) solution in amount sufficient to react with the calcium chloride contained in the treated stock, and the agitation or beating is continued for a period of e. g. 10 or 15 minutes to effect reaction of the sodium silicate with the calcium chloride and the formation of hydrated calcium silicate largely within and also on and around the modified fibers. Sodium chloride is removed from the resulting stock by filtering or washing to remove the sodium chloride. The resulting pulp is then formed into sheets or into lap form or dried to give a dry pigmented fiber. The resulting dry fibrous pigment contains around 85% of hydrated calcium silicate and around 15% of fiber (dry basis).

By varying the amount of calcium chloride used for treating the pulp, the amount of hydrated calcium silicate formed can be varied, and fibrous pigments produced containing, e. g., around 75% of hydrated calcium silicate and 25% of fiber (dry basis) or 90% or more of hydrated calcium silicate and 10% or less of fiber (dry basis).

In the above examples the fibrous pigments contain a relatively small percentage of fiber and an amount of finely precipitated calcium silicate several times the dry weight of the fiber. Although the fibrous content is relatively small it nevertheless has a profound modifying effect in holding the finely divided precipitated hydrated calcium silicate in a condition which minimizes loss of pigment; and the fibrous pigment can be readily incorporated with ordinary paper pulp stock for paper manufacture.

In the production of paper the fibrous pigments, such as those of the above examples, are admixed in pulp form with a much larger proportion of untreated pulp fibers and the stock diluted and formed into a sheet of paper. Sheets of paper can thus be produced with larger or smaller amounts of pigment incorporated therein.

In making multi-ply paper or board the new fibrous hydrated calcium silicate pigment either alone or advantageously mixed with an equal amount or varying amounts of untreated fibers can advantageously be applied as the outer layer or liner of the multi-ply paper or board. The other layers give sufficient strength to the multi-ply paper or board even though the outer highly pigmented layer may be lacking in strength because of the profound modification to which the fibers have been subjected in converting them to the highly pigmented fibers or fibrous pigment. Thus the fibrous pigment produced by the foregoing examples can be used in the form of a stock diluted to proper consistency, e. g., around 1%, and then supplied to the stuff chest regulating box and cylinder vat for use in making the outer layer or liner of a composite sheet of paper on a multi-cylinder machine. The multi-cylinder machine may be otherwise operated in the usual manner to form the multi-layer sheet or board which is passed through the squeeze and pressure rolls and over the driers and calenders, being given a sizing treatment on the calenders.

As illustrating the use of the new fibrous pigments of the above examples admixed with untreated stock for making the coating layer or liner of multi-ply paper or board the highly pigmented fibers may be admixed with an equal proportion of untreated fibers and the resulting composite furnish used in a multi-cylinder machine to form the outer layer or liner of the sheet.

I claim:

1. The method of producing a pigmented and gelatinized cellulosic fibrous stock particularly adapted for admixture with unpigmented cellulosic fibrous stock in the manufacture of paper which comprises subjecting, at ordinary temperatures, an aqueous suspension of cellulosic fibers to the action of a solution of calcium chloride until the calcium chloride brings about a gelatinization of the cellulosic fibers, and adding a solution of sodium silicate to the gelatinized cellulosic fibers containing the calcium chloride to react therewith and precipitate finely-divided hydrated calcium silicate in and on the fibers, the amount of calcium chloride in the solution and the amount of sodium silicate added to the cellulosic fibers being sufficient that the amount of precipitated hydrated calcium silicate remaining in and on the fibers is in excess of the weight of the fibers.

2. The method according to claim 1 in which the cellulosic fibers treated are groundwood.

3. The method according to claim 1 in which the cellulosic fibers treated are chemically-treated fibrous pulp.

4. The method according to claim 1 in which the calcium chloride solution contains from about 13 to 20% of calcium chloride.

5. The method of making pigmented paper on a paper-making machine which comprises admixing the gelatinized and pigmented fibers produced in accordance with the method of claim 1 in amount of from about 5% to 25% with unpigmented cellulosic fibers, and forming a pigmented sheet of paper from the resulting admixed fibers.

6. The method according to claim 5 in which the unpigmented cellulosic fibers are chemically-treated fibrous pulp.

7. The method according to claim 5 in which the unpigmented cellulosic fibers are groundwood.

8. Highly-pigmented gelatinized cellulosic fibers produced in accordance with the method of claim 1 and containing an amount of finely-divided, precipitated, hydrated calcium silicate in excess of the dry weight of the fibers.

9. Highly-pigmented gelatinized cellulosic fibers as defined in claim 8 in which the weight of the finely-divided, precipitated, hydrated calcium silicate is from about 3 to 9 times the dry weight of the fibers.

10. Highly-pigmented gelatinized cellulosic fibers as defined in claim 8 in which the fibers are in the form of a wet lap or sheet.

11. Highly-pigmented cellulosic pulp comprising the dried residue of swollen, hydrated and gelatinized cellulosic fibers and an amount of finely-divided pigment in excess of the dry weight of the fibers, and not exceeding about 9 times the dry weight of the fibers, the pigment consisting of precipitated, hydrated calcium silicate, the finely-divided pigment being largely within the dried residue of the cellulosic fibers and also on and around said fibers, the finely-divided pigment within the fibers having been precipitated in situ therein by reaction of calcium chloride with sodium silicate while the calcium chloride is within the fibers while they are in a swollen, hydrated and gelatinized state, said highly-pigmented cellulosic pulp forming a pulp-like mass on admixture with water.

12. Highly-pigmented cellulosic pulp as defined in claim 11 in which the cellulosic fibers are chemically-treated fibrous pulp.

13. Highly-pigmented cellulosic pulp as defined in claim 11 in which the cellulosic fibers are groundwood.

14. Highly-pigmented cellulosic pulp as defined in claim 11 in which the amount of precipitated, hydrated calcium silicate within, on and around the fibers is from about 3 to 9 times the dry weight of the fibers.

15. A new sheet of paper made of admixed fibers, from 5% to 25% of which are highly pigmented gelatinized cellulosic fibers as defined in claim 8 and the remainder of the fibers are ungelatinized cellulosic fibers.

WILLIAM L. CRAIG.

REFERENCES CITED

The following references are of record in the file of this patent:

UNITED STATES PATENTS

| Number | Name | Date |
|---|---|---|
| 298,281 | Brigham | May 6, 1884 |
| 517,851 | Ehrlicher | Apr. 10, 1894 |

FOREIGN PATENTS

| Number | Country | Date |
|---|---|---|
| 404 | Great Britain | 1869 |
| 262 | Great Britain | 1873 |